United States Patent [19]

Flados

[11] Patent Number: 5,790,225

[45] Date of Patent: Aug. 4, 1998

[54] VARIABLE DENSITY LIGHT-POLARIZING SPECTACLES APPARATUS

[76] Inventor: Mark R. Flados, 11207 Salt Cedar Trail, Austin, Tex. 78750

[21] Appl. No.: 879,666

[22] Filed: Jun. 23, 1997

Related U.S. Application Data

[63] Continuation of Ser. No. 384,762, Feb. 7, 1995, abandoned.

[51] Int. Cl.⁶ ............................................. G02C 7/12
[52] U.S. Cl. ............................................. 351/49; 351/47
[58] Field of Search ........................... 351/44, 45, 47, 351/49

[56] References Cited

U.S. PATENT DOCUMENTS

| | | | |
|---|---|---|---|
| 2,064,812 | 12/1936 | Bouchard | 88/41 |
| 2,380,481 | 7/1945 | Tillyer et al. | 351/49 |
| 2,565,362 | 8/1951 | Eloranta | 88/41 |
| 3,944,346 | 3/1976 | Shindler | 351/49 |
| 3,958,867 | 5/1976 | Morgan | 351/47 |
| 4,264,154 | 4/1981 | Petersen | 351/49 |
| 4,511,225 | 4/1985 | Lipson | 351/49 |
| 4,595,262 | 6/1986 | Ogle, deceased | 350/404 |
| 4,744,633 | 5/1988 | Sheiman | 351/49 |
| 5,210,552 | 5/1993 | Baran et al. | 351/49 |

FOREIGN PATENT DOCUMENTS

| | | | |
|---|---|---|---|
| 1049920 | 8/1953 | France | 351/49 |
| 554592 | 6/1932 | Georgia | 351/47 |
| 506064 | 12/1954 | Italy | 351/49 |
| 2240852 | 8/1991 | United Kingdom | 351/49 |

*Primary Examiner*—William L. Sikes
*Assistant Examiner*—James A. Dudek
*Attorney, Agent, or Firm*—Pravel, Hewitt, Kimball & Krieger

[57] ABSTRACT

A variable density light-polarizing spectacles apparatus comprising a frame having right and left lens carrier portions, a bridge portion, and rearwardly directed temples for supporting the spectacles apparatus before the eyes of the wearer. Inner right and left lenses are rotatably mounted within the right and left lens carrier portions, respectively. Each inner lens has a notched portion at its periphery. A gear assembly is positioned substantially between the right and left lens carrier portions of the frame. The gear assembly meshes with the notched portion of the inner lenses to allow for the simultaneous rotation of the inner right and left lenses. The frame has an upwardly-facing opening substantially above the bridge portion. A portion of the gear assembly extends slightly beyond the upwardly facing opening of the frame to permit manual adjustment of the orientation of the inner lenses. A removable, outer lens assembly slidably engages the frame.

19 Claims, 4 Drawing Sheets

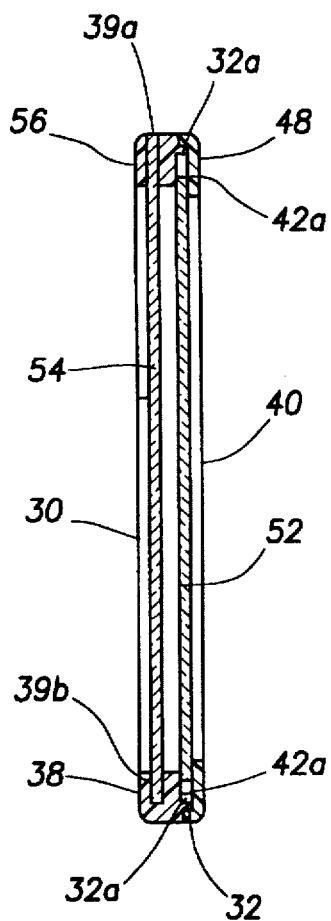
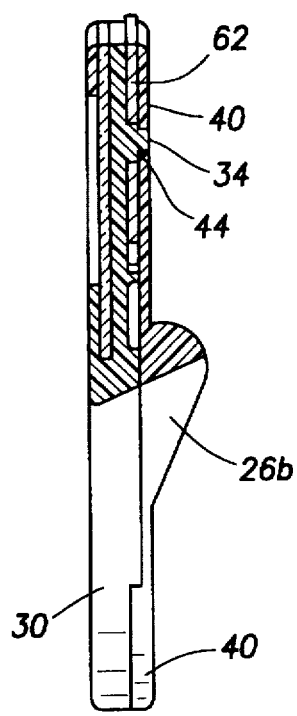
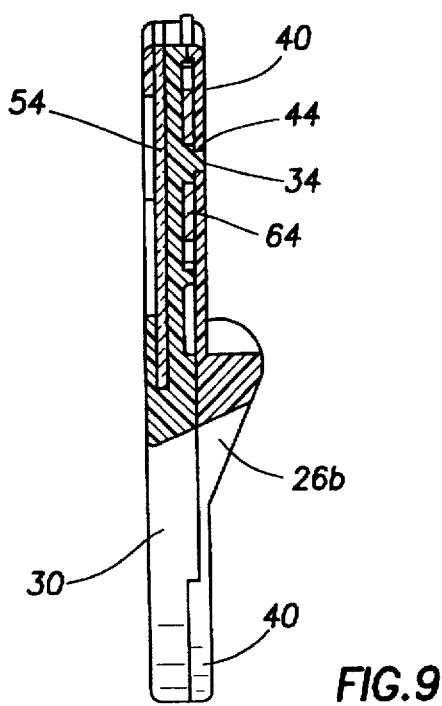
FIG. 7
FIG. 8
FIG. 9

5,790,225

1

VARIABLE DENSITY LIGHT-POLARIZING SPECTACLES APPARATUS

This is a continuation of application Ser. No. 08/384,762 filed on Feb. 7 1995 now abandoned.

SPECIFICATION

BACKGROUND OF THE INVENTION

1. Field of the Invention

The present invention relates to spectacles and more particularly to variable density light-polarizing spectacles.

2. Description of the Prior Art

In the prior art, it is known that variable density light-polarizing spectacles or sunglasses to modify light transmission characteristics can be accomplished by the rotation of a first lens relative to an overlying or underlying second lens. Exemplary of prior art variable density light-polarizing spectacles are those of U.S. Pat. Nos. 4,264,154; 3,958,867; and 3,944,346.

Due to the requirement of a pair of overlying lenses for each eye in providing variable density light-polarizing spectacles, it is vital to ensure that the facing surfaces of each pair of lenses remain substantially clean and free from moisture.

Sunglasses will oftentimes be subjected to water and perspiration in various temperatures resulting in moisture or condensation on the surfaces of the lenses. Thus, it is very likely that moisture and/or condensation will get between and on the facing surfaces of each pair of lenses of the variable density light-polarizing spectacles. It is extremely important that the facing surfaces of the pairs of lenses be easily accessible when cleaning or maintenance is required.

Aesthetic appeal is vitally important to the commercial success of dress spectacles such as sunglasses. Without aesthetic appeal, dress spectacles are destined for failure. Variable density light-polarizing spectacles must also be aesthetically pleasing in addition to being functional and dependable.

It is desirable to have variable density light-polarizing spectacles which are aesthetically pleasing and easy to clean and use. Additionally, the variable density light-polarizing spectacles should be mechanically dependable and commercially viable.

SUMMARY OF THE INVENTION

The variable density light-polarizing spectacles of the present invention provide manual control and adjustability of light transmission through the lenses. The variable density light-polarizing spectacles are simple to use, easy to clean, and attractive in appearance. The polarizing spectacles are also mechanically dependable and commercially viable.

The variable density light-polarizing spectacles include a frame having right and left lens carriers, a bridge portion, and rearwardly directed temples for supporting the spectacles before the eyes of the wearer. Inner right and left lenses are rotatably mounted within the right and left lens carriers, respectively. Each inner lens has a peripheral notched portion. A gear assembly is positioned substantially above the bridge portion. The gear assembly meshes with the notched portions of the inner lenses to allow for the simultaneous rotation of the inner right and left lenses. The frame has an upwardly-facing opening substantially above the bridge portion. A portion of the gear assembly extends slightly beyond the upwardly facing opening of the frame to permit manual adjustment of the orientation of the inner lenses. A removable, outer lens assembly slidably engages the frame.

BRIEF DESCRIPTION OF THE DRAWINGS

In order to more fully understand the drawings referred to in the detailed description of the present invention, a brief description of each drawing is presented, in which:

FIG. 7 is sectional view taken along line 7—7 of FIG. 2;

FIG. 8 is sectional view taken along line 8—8 of FIG. 2; and

FIG. 9 is sectional view taken along line 9—9 of FIG. 2.

DETAILED DESCRIPTION OF THE INVENTION

Figure 1:
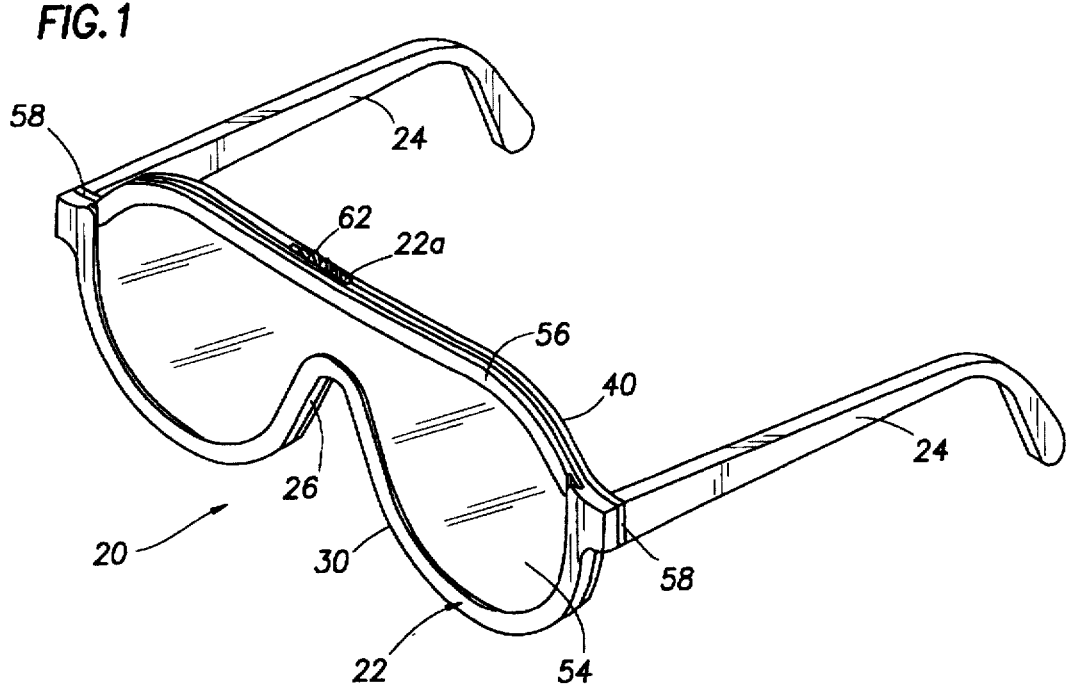
FIG. 1 is a perspective view of the variable density light-polarizing spectacles of the present invention.
Figure 2:
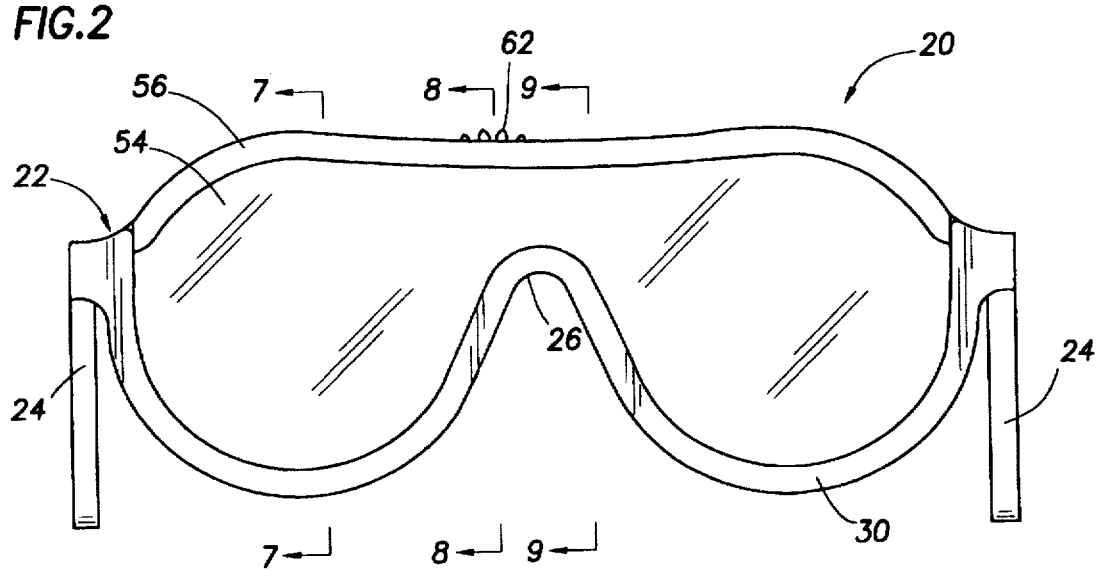
FIG. 2 is a front elevational view of the variable density light-polarizing spectacles of FIG. 1.

Referring now to the drawings in detail and more specifically to FIGS. 1 and 2, the variable density light-polarizing (VDLP) spectacles 20 of the present invention comprise a frame assembly 22 having a bridge portion 26 and a pair of rearwardly disposed temple portions 24 for supporting the VDLP spectacles 20 before the eyes of the wearer.

Figure 3:
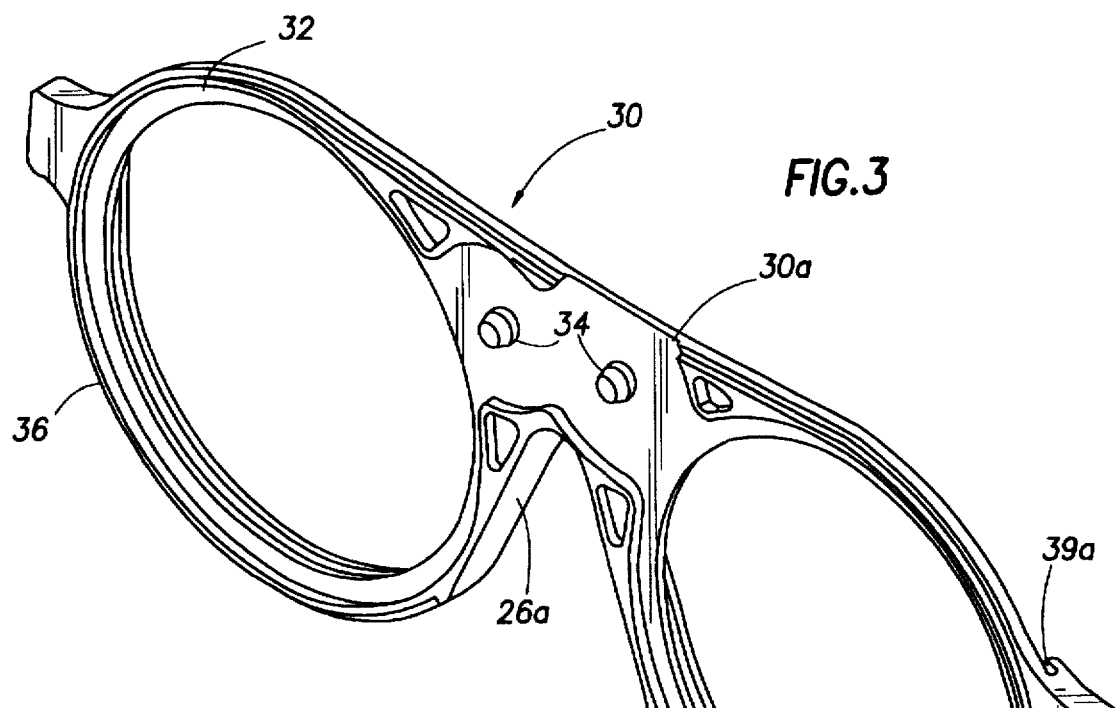
FIG. 3 is a back perspective view of the outer frame member.
Figure 4:
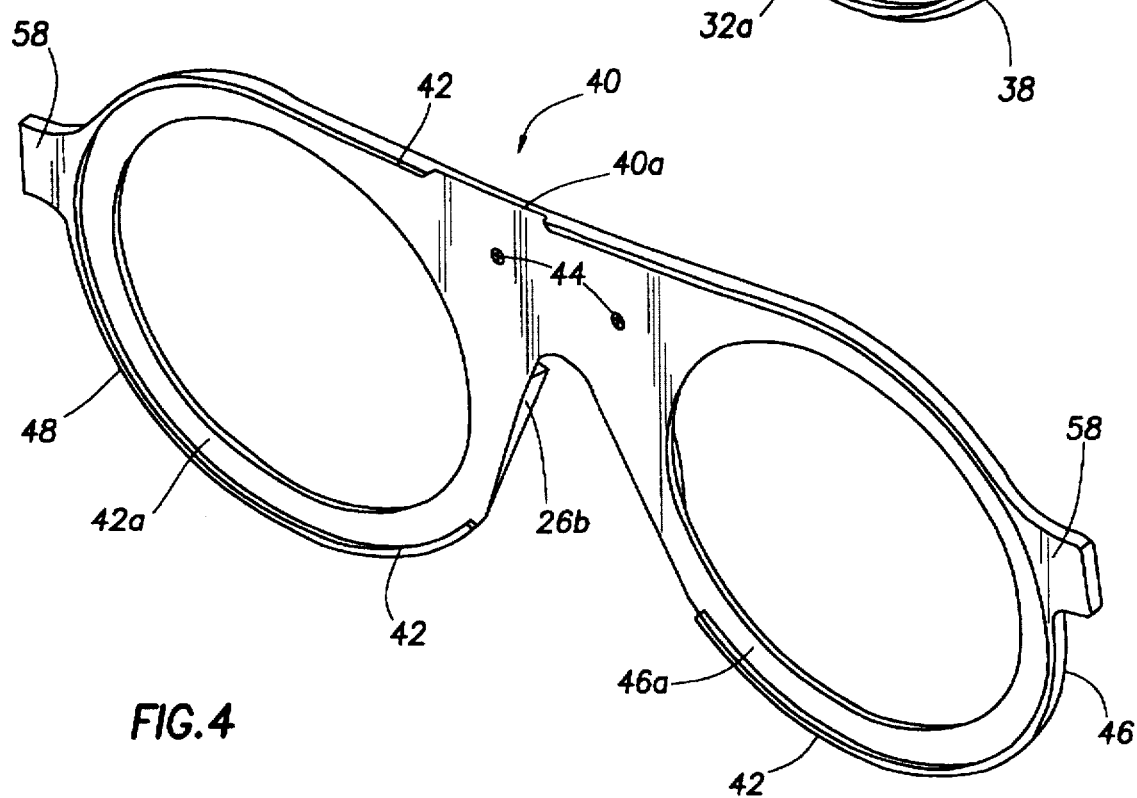
FIG. 4 is a front perspective view of the inner frame member.

The frame assembly 22 includes a front face member 30 and a rear face member 40, shown in FIGS. 3 and 4, respectively. In the preferred embodiment, the face members 30 and 40 are press-fit together. A periphery lip 42 extending from an inside surface of the rear face member 40 is matable with an offset lip 32 on an inside surface of the front face member 30. The face members 30 and 40 are also joined by a pair of posts 34 (FIG. 3) extending from the inside surface of the front face member 30 and engageable in corresponding post receivers 44 (FIG. 4) in the rear face member 40 as shown in FIGS. 8 and 9.

Figure 5:
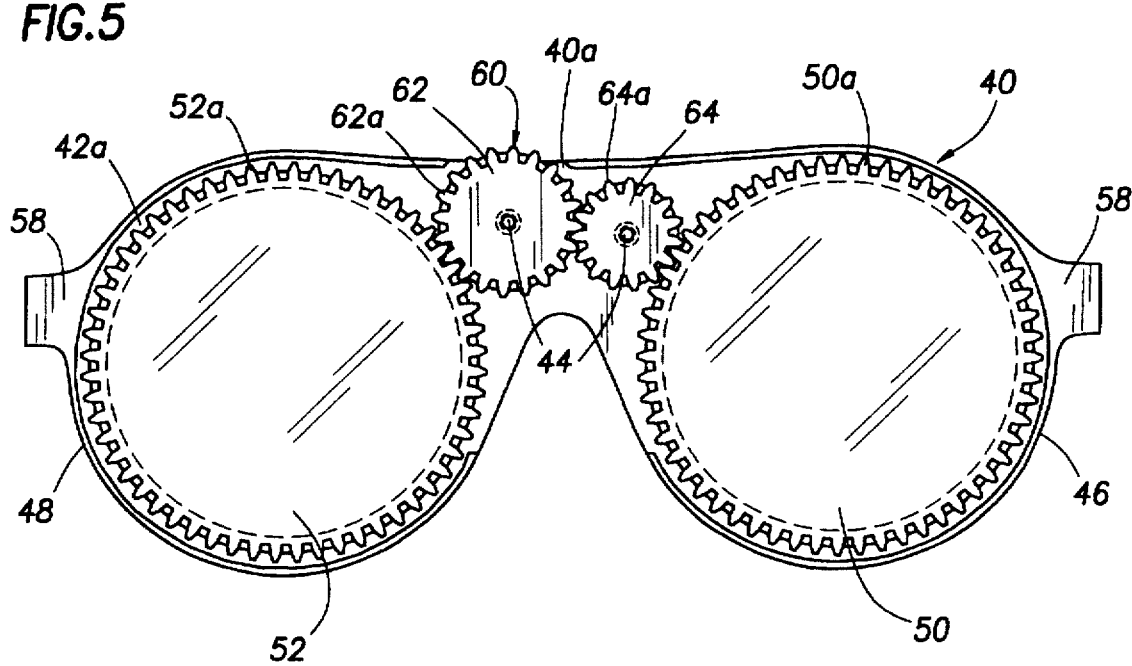
FIG. 5 is a front elevational view of the variable density light-polarizing spectacles showing the rotatable lenses and gear assembly with the outer frame member removed for clarity.

Referring to FIG. 3, the front face member 30 of the frame assembly 22 includes left and right lens carriers 36 and 38, respectively. As shown in FIG. 4, the rear face member 40 includes left and right lens carriers 46 and 48, respectively. Referring to FIGS. 3–5, the left lens carriers 36 and 46 support an inner left lens 50 and the right lens carriers 38 and 48 support an inner right lens 52. Referring to FIGS. 3, 4 and 7, the inner right lens 52 is supported between a ledge 32a of offset lip 32 on the right front lens carrier 38 and a wall 42a of the right rear lens carrier 48. The inner left lens 50 is similarly situated between left front and rear lens carriers 36 and 46.

The inner lenses 50, 52 are rotatable to effect polarization with the use of the VDLP spectacles. As shown in FIG. 5, inner left and right lenses 50, 52 each have notched portions 50a and 52a at their respective peripheries to allow simultaneous rotation. In the preferred embodiment, the notched portions 50a and 52a extend around the entirety of the periphery of each respective inner lens 50, 52.

The rotational movement of the inner lenses 50 and 52 is controlled by a gear assembly 60 as shown in FIG. 5. The gear assembly 60 is positioned substantially above the bridge portion 26 of the frame assembly 22. The gear assembly 60 meshes with the notched portions 50a and 52a of the inner lenses 50 and 52 to allow simultaneous rotation of both inner lenses 50 and 52. In the preferred embodiment as shown in FIGS. 5, 8 and 9, the gear assembly 60 includes primary and secondary gear members 62 and 64, respectively, which are rotatably mounted on the pair of posts 34 (FIG. 3) of the front face member 30. In FIG. 5, the gear members 62 and 64 are shown seated over post receivers 44 on the rear face member 40.

Each gear member 62, 64 has peripheral gear notches 62a and 64a, which are similar to the notches 50a and 52a on the inner lenses 50 and 52. At a location between the pair of posts 34, the gear notches 62a and 64a mesh with each other. Generally opposite the location where the gear notches 62a and 64a mesh with each other, each gear member 62, 64 similarly interacts with the notches on the respective adjacent inner lens. Thus, the gear notches 62a mesh with right inner lens notch portions 52a and the gear notches 64a mesh with left inner lens notch portions 50a.

In order for the VDLP spectacle wearer to effect light polarization, he/she must be able to control the orientation and rotation of the inner lenses 50 and 52. To allow manual adjustment of the orientation of the inner lenses 50, 52, the frame assembly 22 has an upwardly-facing opening 22a located generally above the bridge portion 26 (FIG. 1). As shown in FIGS. 3 and 4, the opening 22a is formed by corresponding gaps 30a, 40a in the front and rear face members, 30 and 40, respectively. When the gear assembly 60 is in place, a portion of the primary gear member 62 extends slightly beyond the upwardly facing opening 60 of the frame assembly 22 as shown in FIGS. 1 and 5. The minimal extension of the gear assembly 60 outside the frame assembly 22 permits adjustment of the inner lenses 50, 52 while preserving the aesthetic appeal of the spectacles 20.

Figure 6:
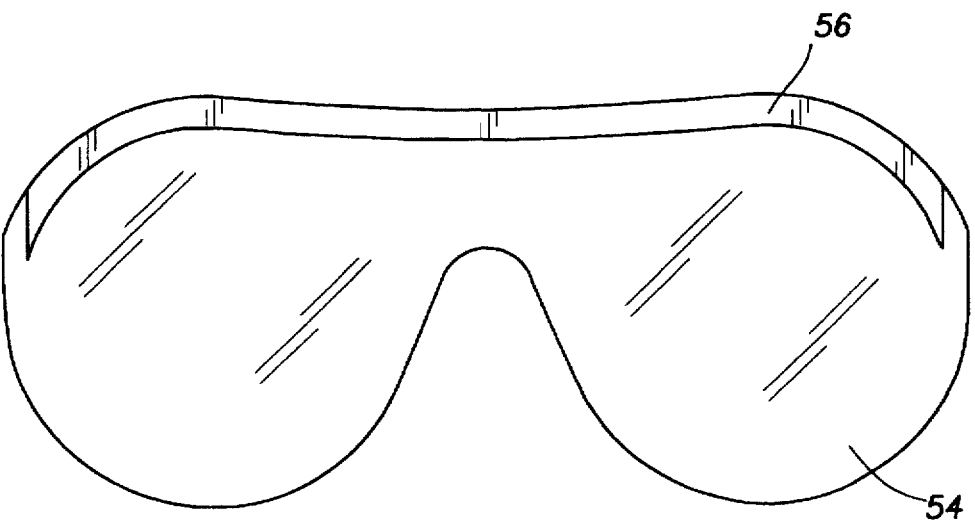
FIG. 6 is a front elevational view of the outer lens assembly.

A second lens over each eye is necessary to allow for light polarization. An advantage of the present invention is the use of a single outer lens 54 (FIG. 6) that is slidably engageable in the frame assembly 22. This configuration allows the inner and outer lenses to be readily and easily cleaned, an essential requirement for the effective use of light polarizing spectacles. In the preferred embodiment as shown in FIGS. 3 and 7, the lens carriers 36 and 38 of the front face member 30 each have a slot 39a for insertion and removal of the outer lens 54 and a groove 39b for supporting the outer lens. As shown in FIGS. 1, 2 and 6, a trim member 56 of the same frame style as the front face member 30 may be included along the upper edge of the outer surface of the outer lens 54 for aesthetic appeal.

The bridge portion 26 of the frame assembly is formed of a front face bridge section 26a (FIG. 3) and a rear face bridge section 26b (FIG. 4). The front face bridge section 26a is an extension of the offset lip 32 and corresponds with the rear face bridge section 26b when the front and rear face members 30 and 40, respectively, are connected. As shown in FIG. 1, the rearwardly disposed temple portions 24 are connected to the rear face member 40 along tab portions 58 with any conventional connectors, such as hinges or screws (not shown).

Cleaning the lenses 50, 52 and 54 of the VDLP spectacles 20 is extremely easy. The outer lens 54 is easily removed by gripping the trim member 56 and vertically sliding the outer lens out of the slot 39a and groove 39b. After cleaning each of the surfaces of the lenses 50, 52 and 54, the outer lens 54 is replaced in a similar manner.

In use, the wearer enjoys maximum convenience to adjust the amount of light polarization during changes of light intensity by simply sliding a finger along the upper surface of the face members 30 and 40 over the upwardly facing opening 22a to rotate the gear member 62 until the desired polarization effect is achieved. In actuality, the gear member 62 only needs to extend slightly above the upper surface of the face members 30 and 40 and will thus be virtually unnoticeable to any casual observer. Thus, the VDLP spectacles 20 further enjoy a stylish look without noticeably appearing to be polarizing spectacles.

The VDLP spectacles 20 of the present invention have been described with particular reference to eyeglasses of variable optical transmission such as adjustable sunglasses, but features are suitable for advantageous application in other kinds of optical devices.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A variable density light-polarizing spectacles apparatus comprising:
    an assembled frame assembly having right and left lens carrier portions, a nose engaging bridge portion, and rearwardly directed temples for supporting the spectacles apparatus before the eyes of the wearer;
    a first right lens rotatably mounted in said right lens carrier portion;
    a first left lens rotatably mounted in said left lens carrier portion;
    means for simultaneously rotating said first right and first left lenses; and
    a removable second right and left lens assembly slidably engaging said assembled frame assembly, said removable lens assembly capable of a first position received in said assembled frame assembly and a second position slidably removed from said assembled frame assembly for cleaning said lens assembly.

2. The spectacles apparatus of claim 1, further comprising means for controlling the orientation of said first right and first left lenses.

3. The spectacles apparatus of claim 2, wherein said assembled frame assembly has an upper surface and said means for controlling extends from said upper surface.

4. The spectacles apparatus of claim 1, wherein said assembled frame assembly further comprises an insertion and removal slot for the insertion and removal of said removable lens assembly relative to said assembled frame assembly.

5. The spectacles apparatus of claim 4, wherein said assembled frame assembly futher comprises a support groove for supporting said removable lens assembly received in said assembled frame assembly.

6. The spectacles apparatus of claim 1, wherein said removable lens assembly slides in a plane parallel to said first left and right lenses.

7. The spectacles apparatus of claim 1, wherein said removable lens assembly includes a trim member for gripping said removable lens assembly while positioning said removable lens assembly relative to said assembled frame assembly.

8. A variable density light-polarizing spectacles apparatus comprising:
- an assembled frame assembly having right and left lens carrier portions, a nose engaging bridge portion, and rearwardly directed temples for supporting the spectacles apparatus before the eyes of the wearer;
- an inner right lens rotatably mounted in said right lens carrier portion;
- an inner left lens rotatably mounted in said left lens carrier portion;
- means for simultaneously rotating said inner right and inner left lenses;
- a removable outer lens assembly removably engageable with said assembled frame assembly;
- said assembled frame assembly having an upwardly-facing opening substantially above said nose engaging bridge portion; and
- means for controlling the orientation of said inner right and inner left lenses, said controlling means extending from the upwardly-facing opening.

9. The spectacles apparatus of claim 8, wherein said means for simultaneously rotating said inner right and inner left lenses comprises a gear assembly positioned substantially between said right and left lens carrier portions of said assembled frame assembly.

10. The spectacles apparatus of claim 9, wherein said means for simultaneously rotating further comprises said inner right and inner left lenses each having a notched portion at its periphery and said gear assembly comprises a plurality of gears meshing with one another and with said notched portions of said inner right and inner left lenses.

11. The spectacles apparatus of claim 8, wherein said assembled frame assembly further comprises an insertion and removal slot for the insertion and removal of said removable outer lens assembly relative to said assembled frame assembly.

12. The spectacles apparatus of claim 11, wherein said assembled frame assembly further comprises a support groove for supporting said removable outer lens assembly inserted in said assembled frame assembly.

13. The spectacles apparatus of claim 11, wherein said removable outer lens assembly slides in a plane substantially parallel to said inner left and right lenses.

14. The spectacles apparatus of claim 11, wherein said removable outer lens assembly includes a trim member for gripping said removable outer lens assembly while inserting and removing said removable outer lens assembly relative to said assembled frame assembly.

15. A variable density light-polarizing spectacles apparatus comprising:
- an assembled frame assembly having right and left lens carrier portions, a nose engaging bridge portion, and rearwardly directed temples for supporting the spectacles apparatus before the eyes of the wearer;
- an inner right lens rotatably mounted in said right lens carrier portion;
- an inner left lens rotatably mounted in said left lens carrier portion;
- a gear assembly positioned substantially between said right and left lens carrier portions of said assembled frame assembly;
- an outer lens assembly slidably received in said assembled frame assembly, said outer lens assembly comprising a single outer lens;
- said assembled frame assembly having an upwardly-facing opening substantially above said nose engaging bridge portion;
- said inner right and inner left lenses each having a notched portion at its periphery and said gear assembly comprises a plurality of gears meshing with one another and with said notched portions of said inner right and inner left lenses; and
- means for controlling the orientation of said inner right and inner left lenses, said controlling means extending from the upwardly-facing opening.

16. The spectacles apparatus of claim 15, wherein said assembled frame assembly further comprises an insertion and removal slot for insertion and removal of said outer lens assembly relative to said assembled frame assembly.

17. The spectacles apparatus of claim 16, wherein said assembled frame assembly further comprises a support groove for supporting said outer lens assembly inserted in said assembled frame assembly.

18. The spectacles apparatus of claim 17, wherein said outer lens assembly slides in a plane substantially parallel to said inner left and right lenses.

19. The spectacles apparatus of claim 16, wherein said outer lens assembly includes a trim member for gripping said outer lens assembly while positioning said outer lens assembly relative to said assembled frame assembly.

* * * * *